Patented Dec. 5, 1944

2,364,456

UNITED STATES PATENT OFFICE 2,364,456

PROCESS FOR PREPARING DYESTUFFS OF THE ANTHRAQUINONE SERIES

Ralph N. Lulek, Wilmington, Del., assignor to E. I. du Pont de Nemours & Company, Wilmington, Del., a corporation of Delaware No Drawing. Application December 16, 1942, Serial No. 469,221

3 Claims. (Cl. 260—316)

This invention relates to an improvement in the process for preparing dyestuffs of the anthraquinone series, and more particularly to an improved process for producing alpha-tetra- and alpha-pentanthrimide-carbazoles from the corresponding anthrimides.

As pointed out in U. S. Patent 2,028,103, there was originally described in German Patent 260,788 of 1913 a process for producing an olive green vat dye by fusing pentanthrimide with aluminum chloride. According to the original disclosure, 4 parts of aluminum chloride were employed per part of pentanthrimide, and the mass was heated to temperatures of 270° C. It was later discovered by Dr. Graham (see U. S. Patent 2,028,-103) that when pentanthrimide was fused with aluminum chloride under more mild conditions than those disclosed in the German patent, a dyestuff that was much brighter and greener in shade and which had improved dyeing properties could be produced. According to his process, the pentanthrimide was fused with a mixture of aluminum chloride and sodium chloride at temperatures of from 175° to 200° C. The addition of sodium carbonate to the reaction was also found desirable in bringing about complete reaction under the more mild conditions described. According to the processes of U. S. Patents 2,028,-103 and 2,167,434, the alpha-pentanthrimide and the alpha-tetranthrimide are heated with from 8 to 15 parts of aluminum chloride and with a small amount of sodium chloride and soda ash to give a new and desirable yellowish-olive dyestuffs.

It is an object of the present invention to provide a process for fusing tetra- or pentanthrimide to the corresponding carbazole in the absence of organic solvents and in a manner which requires much less aluminum chloride than is normally employed, thereby resulting in a greater economy of materials required for producing these dyestuffs.

It is a further object of the invention to provide a continuous process for the fusion of alpha-tetra- or alpha-pentanthrimide to the corresponding carbazole wherein the fusion mass is passed through a heated zone in such a manner that only small quantities are subjected to the reaction temperature, thereby preventing local overheating and permitting the use of lower temperatures than those employed where the reaction is carried out batchwise on a commercial scale.

In the fusion of the tetra- or pentanthrimide with aluminum chloride considerable heat of reaction is evolved, thereby making it necessary, when the reaction is carried out in large batches, to employ a sufficient amount of aluminum chloride, or mixture of aluminum chloride with a flux such as sodium chloride, to permit good agitation whereby the temperature of the mass can be readily controlled, for the quality and yield of anthrimide-carbazole obtained is dependent upon the uniformity to which the mass has been heated. Where the anthrimide to be ring closed is added in small portions to the aluminum chloride or aluminum chloride-sodium chloride melt so as to insure complete solution in the melt without too rapid a rise in temperature, the process involves too long a time cycle for practical operation and is limited by the size of the charges which can be made.

I have found that, by intimately mixing the anthrimide to be cyclicized with from 2 to 4 parts of aluminum chloride and an amount of an alkali metal halide equal to from 10% to 50% of the weight of aluminum chloride employed, and exposing this reaction mixture in comparatively thin layers to a source of heat, a fluid melt results at the relatively low melting temperature of the mixture of the inorganic components, usually within the range of from 120° to 140° C., and the anthrimide incorporated in the melt starts to react immediately and is converted to the carbazole by the evolution of heat liberated in the reaction. Since no more heat than that initially required to effect a melt of the aluminum chloride-alkali halide mixture must be applied, the reaction can be readily controlled and overheating is eliminated. The melt remains fluid sufficiently long to permit its removal from the source of heat, and to be drowned in water.

This reaction may be carried out on an endless belt; in pans travelling on an endless belt; in troughs fitted with screw type conveyors; on a rotary circular table fitted with scraping devices; on a vibrating inclined trough or table; or in any other type of apparatus that permits a continuous flow of the mass through a heated zone. The reaction mass may be heated either externally with electric, steam or other heating device, or by direct irradiation by means of infra-red heat ray lamps.

In general the invention comprises the fusion of an alpha-tetra- or pentanthrimide with only sufficient aluminum chloride-alkali halide to produce a fluid melt in a manner whereby the fusion mass may be continuously removed as it is formed.

The following example is given to illustrate the invention. The parts used are by weight.

Example 1

An intimate mixture of 52.6 pounds of pentanthrimide, 157.8 pounds of aluminum chloride, 26.3 pounds of potassium chloride and 18.4 pounds of sodium chloride, ground to a fineness of approximately 100 mesh, is charged onto a vibrating table which is heated by means of infra-red lamps to 120°–140° C. in a thin layer of from 0.25 to 0.5 inch in depth. The powdered mix fuses as it runs onto the table, and flows down the vibrating table and out of the heated zone at a predetermined rate. The rate of flow is controlled by the pitch of the table and the amount of vibration employed. The reaction mass, which is ring closed or carbazolated within a few minutes, is discharged at the end of the table into water. The water suspension is filtered and the residue washed with water. The resulting product may be purified, if desired, by oxidation with the usual oxidizing agents employed for this type of compound. It dyes in khaki shades identical in every respect to the product obtained by the process described in U. S. Patent No. 2,028,103.

If in the above procedure tetranthrimide is used in place of pentanthrimide, a product is obtained which is identical to the one described in U. S. Patent 2,167,434.

In the above example a mixture of potassium chloride and sodium chloride is used with the aluminum chloride to produce a fluid fusion mass, for it has been found that, by using a mixture of the alkali metal chlorides with the aluminum chloride, a fluid melt may be obtained with a minimum amount of aluminum chloride. The sodium chloride or potassium chloride may be employed alone with the aluminum chloride, if desired.

The reaction mixture may be applied to the moving reaction belt, table, etc., in layers of from a fraction of an inch to an inch in depth, depending upon the speed with which it moves along out of the heated zone as it melts. The pitch of the reaction table or belt should be such that as the mass melts and the reaction occurs, the mass will flow into a thin enough layer that there will be no overheating. Where the layer of reacting materials is carried through the source of heat in pans or on a belt, the layer should be relatively thin so that overheating does not take place.

I claim:

1. In the process of fusing a compound of the class consisting of alpha-tetranthrimide and alpha-pentanthrimide with aluminum chloride to produce the corresponding anthrimide-carbazole, the steps which comprise intimately mixing the anthrimide with from 2 to 4 parts of aluminum chloride and an amount of alkali metal chloride equal to from 10% to 50% of the weight of aluminum chloride employed, and heating the resulting mixture in a thin layer of approximately 0.25 to 0.5 inch in depth to form a fluid melt, and removing the fluid melt from the heating zone substantially as rapidly as it is fused into the fluid melt, the layer during the reaction period being kept sufficiently thin that excessive temperatures due to the heat of reaction are not attained.

2. In the process of fusing alpha-pentanthrimide with aluminum chloride to produce the corresponding anthrimide-carbazole, the steps which comprise intimately mixing the anthrimide with from 2 to 4 parts of aluminum chloride and an amount of alkali metal chloride equal to from 10% to 50% of the weight of aluminum chloride employed, and heating the resulting mixture in a thin layer of approximately 0.25 to 0.5 inch in depth to form a fluid melt, and removing the fluid melt from the heating zone substantially as rapidly as it is fused into the fluid melt, the layer during the reaction period being kept sufficiently thin that excessive temperatures due to the heat of reaction are not attained.

3. In the process of fusing alpha-tetranthrimide with aluminum chloride to produce the corresponding anthrimide-carbazole, the steps which comprise intimately mixing the anthrimide with from 2 to 4 parts of aluminum chloride and an amount of alkali metal chloride equal to from 10% to 50% of the weight of aluminum chloride employed, and heating the resulting mixture in a thin layer of approximately 0.25 to 0.5 inch in depth to form a fluid melt, and removing the fluid melt from the heating zone substantially as rapidly as it is fused into the fluid melt, the layer during the reaction period being kept sufficiently thin that excessive temperatures due to the heat of reaction are not attained.

RALPH N. LULEK.